United States Patent
Weissmann et al.

(10) Patent No.: US 11,157,329 B2
(45) Date of Patent: Oct. 26, 2021

(54) TECHNOLOGY FOR MANAGING PER-CORE PERFORMANCE STATES

(71) Applicant: Intel Corporation, Santa Clara, CA (US)

(72) Inventors: Eliezer Weissmann, Haifa (IL); Hisham Abu-Salah, Majdal Shams (IL); Nir Rosenzweig, Givat Ella (IL); Efraim Rotem, Haifa (IL)

(73) Assignee: Intel Corporation, Santa Clara, CA (US)

( * ) Notice: Subject to any disclaimer, the term of this patent is extended or adjusted under 35 U.S.C. 154(b) by 46 days.

(21) Appl. No.: 16/523,009

(22) Filed: Jul. 26, 2019

(65) Prior Publication Data
US 2021/0026708 A1 Jan. 28, 2021

(51) Int. Cl.
*G06F 1/08* (2006.01)
*G06F 1/324* (2019.01)
*G06F 9/50* (2006.01)

(52) U.S. Cl.
CPC .............. *G06F 9/5094* (2013.01); *G06F 1/08* (2013.01); *G06F 1/324* (2013.01); *G06F 2209/508* (2013.01)

(58) Field of Classification Search
CPC .... G06F 1/3203; G06F 1/3215; G06F 1/3231; G06F 1/324; G06F 1/3296; G06F 1/3206; G06F 1/08; G06K 15/4055
See application file for complete search history.

(56) References Cited

U.S. PATENT DOCUMENTS

| 5,996,084 A | * | 11/1999 | Watts .................. G06F 11/3423 713/323 |
| 7,502,948 B2 | | 3/2009 | Rotem et al. |
| 9,098,261 B2 | | 8/2015 | Sistla et al. |

(Continued)

FOREIGN PATENT DOCUMENTS

| EP | 2818972 | 12/2014 |
| WO | WO2019117961 | 6/2019 |

OTHER PUBLICATIONS

European Patent Office, European Search Report dated Oct. 9, 2020 in European patent application No. 20 16 3071, 11 pages total.

(Continued)

*Primary Examiner* — Raymond N Phan
(74) *Attorney, Agent, or Firm* — Trop Pruner & Hu, P.C.

(57) ABSTRACT

A processor comprises multiple cores and power management control logic to determine (a) a preliminary frequency for each of the cores and (b) a maximum frequency, based on the preliminary frequencies. The power management control logic is also to determines a dynamic tuning frequency, based on the maximum frequency and a reduction factor. In response to the dynamic tuning frequency for a selected core being greater than the preliminary frequency for that core, the power management control logic is to set the core to a frequency that is at least equal to the dynamic tuning frequency. In response to the preliminary frequency for the selected core being greater than the dynamic tuning frequency for that core, the power management control logic is to set the core to a frequency that is at least equal to the preliminary frequency. Other embodiments are described and claimed.

22 Claims, 11 Drawing Sheets

(56) References Cited

U.S. PATENT DOCUMENTS

| | | | |
|---|---|---|---|
| 9,292,068 B2 | 3/2016 | Ananthakrishnan et al. | |
| 9,361,101 B2 | 6/2016 | Rotem et al. | |
| 9,442,739 B2 | 9/2016 | Therien et al. | |
| 9,600,058 B2 | 3/2017 | Abu Salah et al. | |
| 9,618,997 B2 | 4/2017 | Ananthakrishnan et al. | |
| 9,671,853 B2 | 6/2017 | Aizik et al. | |
| 9,710,043 B2 | 7/2017 | Weissmann et al. | |
| 9,760,160 B2 | 9/2017 | Weissmann et al. | |
| 9,785,226 B2 | 10/2017 | Rotem et al. | |
| 9,983,644 B2 | 5/2018 | Zobel et al. | |
| 10,127,039 B2 | 11/2018 | Rotem et al. | |
| 10,175,740 B2 | 1/2019 | Weissmann et al. | |
| 10,216,246 B2 | 2/2019 | Rajwan et al. | |
| 10,228,755 B2 | 3/2019 | Rajwan et al. | |
| 10,275,260 B2 | 4/2019 | Therien et al. | |
| 10,281,975 B2 | 5/2019 | Rotem et al. | |
| 10,372,197 B2 | 8/2019 | Sistla et al. | |
| 10,372,198 B2 | 8/2019 | Weissmann et al. | |
| 10,620,682 B2 | 4/2020 | Gupta et al. | |
| 10,678,319 B2 | 6/2020 | Rajwan et al. | |
| 10,739,842 B2 | 8/2020 | Gorbatov et al. | |
| 2011/0138195 A1* | 6/2011 | Kim | G06F 9/5094 713/300 |
| 2012/0005514 A1* | 1/2012 | Henry | G06F 1/3203 713/340 |
| 2012/0054519 A1* | 3/2012 | Branover | G06F 1/324 713/322 |
| 2012/0079290 A1* | 3/2012 | Kumar | G06F 1/3206 713/300 |
| 2013/0097453 A1* | 4/2013 | Choi | G06F 1/324 713/501 |
| 2014/0068284 A1* | 3/2014 | Bhandaru | G06F 1/3225 713/300 |
| 2014/0208141 A1* | 7/2014 | Bhandaru | G06F 1/3206 713/322 |
| 2015/0160714 A1* | 6/2015 | Jun | G06F 1/3206 713/322 |
| 2017/0192450 A1 | 7/2017 | On | |
| 2018/0210532 A1* | 7/2018 | Zhang | G06F 9/5094 |
| 2018/0232330 A1 | 8/2018 | Weissmann et al. | |
| 2019/0041944 A1 | 2/2019 | Abu Salah et al. | |
| 2019/0205061 A1 | 7/2019 | Weissmann et al. | |

OTHER PUBLICATIONS

"Intel® 64 and IA-32 Architectures, Software Developer's Manual, vol. 3B: System Programming Guide, Part 2", Sep. 2016, 582 pages, Intel Corporation.

"PerfEnergyPreference", Microsoft, Oct. 4, 2017, 2 pages.

"Dell XPS Speed Shift", NotebookReview, downloaded Jun. 27, 2019, 17 pages.

Kidd, "Power Management States: P-States, C-States, and Package C-States", Aug. 4, 2014, 22 pages, Intel Corporation.

Chen, et al., "Understanding P-State Control on Intel Xeon Scalable Processors to Maximize Energy Efficiency", May 16, 2019, 34 pages, Lenovo Press.

* cited by examiner

TECHNOLOGY FOR MANAGING PER-CORE PERFORMANCE STATES

TECHNICAL FIELD

The present disclosure pertains in general to data processing systems and in particular to technology to enable processors to be energy efficient.

BACKGROUND

A data processing system may include a central processing unit (CPU) with multiple cores, and each core may include multiple logical processors (LPs). The CPU may be capable of executing at different frequencies at different times, with more power being needed as the frequency increases. In particular, each acceptable frequency may be paired with a corresponding voltage requirement. Each different voltage-frequency pairing that a CPU supports may be referred to as a "performance state" or "P-state."

A conventional CPU may be designed to utilize a monolithic P-state model. Under the monolithic P-state model, the processor always uses the same P-state for all of the cores. In other words, the current P-state sets the speed and voltage for all of the cores in the CPU. Thus, for such a CPU, the P-state is per CPU.

Some current development efforts are directed towards a type of CPU that allows different cores in the CPU to use different P-states at the same. In other words, this type of CPU supports per-core P-state. As described in greater detail below, the present disclosure introduces technology to enable a CPU to automatically select efficient per-core P-states.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

As indicated above, the present disclosure introduces technology to enable a CPU to manage per-core P-state for efficiency.

Figure 1:
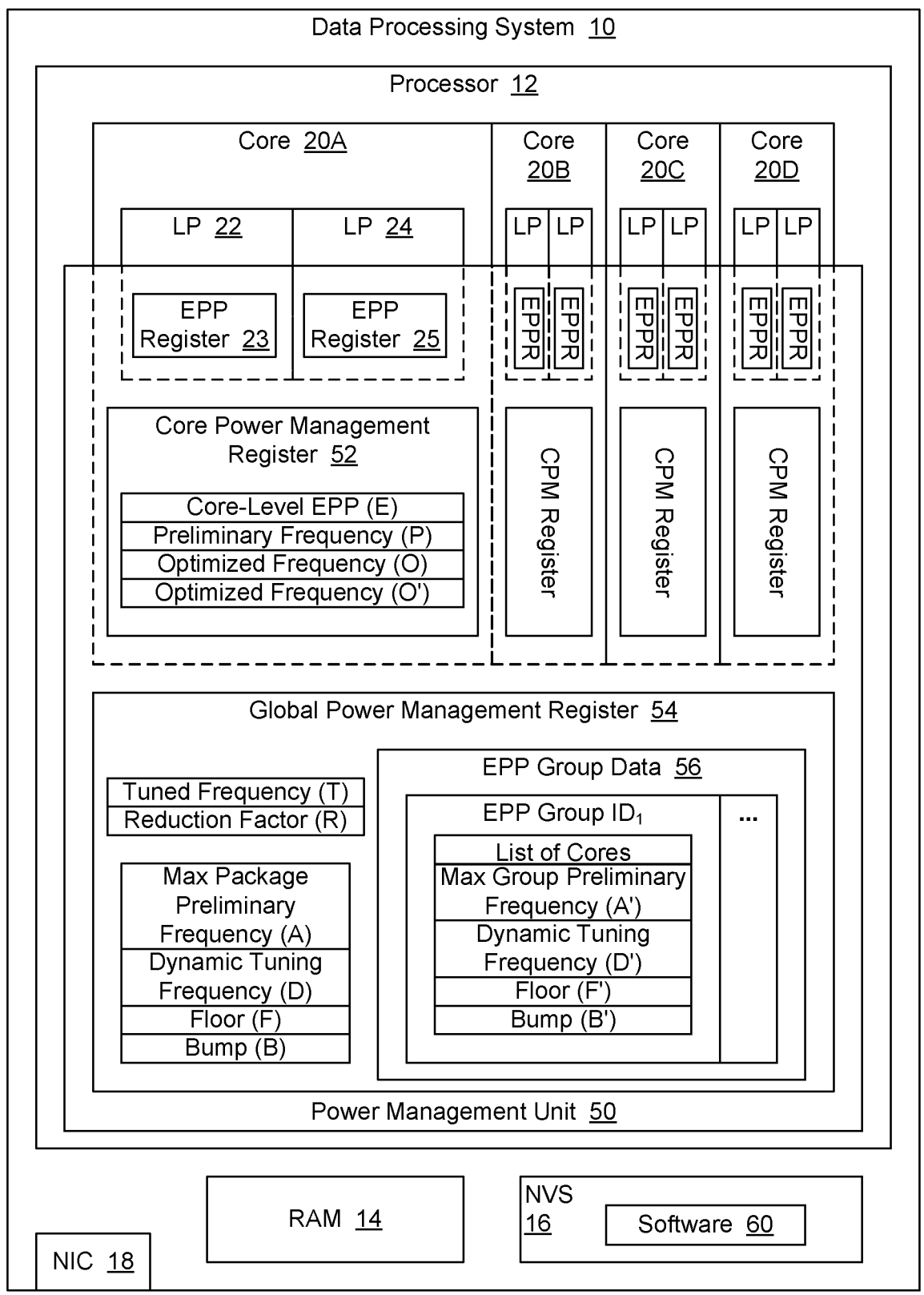
FIG. 1 is a block diagram depicting an example embodiment of a data processing system with technology for automatically selecting efficient per-core P-states.

FIG. 1 is a block diagram depicting an example embodiment of a data processing system 10 with technology for automatically selecting efficient per-core P-states. Data processing system 10 is a hypothetical system, with various hypothetical components and features to illustrate the technology introduced herein.

In the embodiment of FIG. 1, data processing system 10 includes a CPU or processor 12, along with other components such as random access memory (RAM) 14, non-volatile storage (NVS) 16, a network interface controller (NIC) 18, etc. Also, in the embodiment of FIG. 1, processor 12 includes four cores 20A-20D, as well as other modules, such as a power management unit (PMU) 50. PMU 50 may also be referred to as a power control unit. In addition, each core provides for two logical processors (LPs). For instance, core 20A includes LP 22 and LP 24. However, in other embodiments, a processor may include fewer cores or more cores, and fewer LPs or more LPs per core. For instance, a processor may include tens or hundreds of cores, and each of those cores may include one or more LPs. A processor may be implemented as an integrated circuit or "chip" that is mounted to a substrate to form a package. Alternatively, a processor may be implemented as a package that contains more than one chip.

NVS 16 includes software 60, which may include an operating system (OS), one or more user applications, etc. Data processing system 10 may copy software 60 into RAM 14 for execution on one or more of the LPs. In particular, data processing system 10 may execute software 60 as threads on processor 12, and each LP may execute a thread concurrently with other threads running on other LPs.

In processor 12, PMU 50 is capable of setting each core to a different P-state. In other words, processor 12 supports per-core P-state.

As described in greater detail below, in the embodiment of FIG. 1, PMU 50 includes various data storage structures to contain power management settings pertaining to the various cores, LPs, and such within processor 12. For purposes of this disclosure, such data storage structures may be referred to as registers. In one embodiment, such registers are implemented as "special-purpose registers" (SPRs). An SPR may also be referred to as a "model-specific register" (MSR).

As described in greater detail below, one type of power management setting may be referred to as an "efficiency/performance preference (EPP) setting," and PMU 50 may provide one EPP register for each LP, to enable the OS to provide a different EPP setting for each different thread being executed. In particular, the OS may use the EPP setting for an LP to provide an indication to the processor as to whether the thread for that LP should be executed in a manner to prefer energy efficiency or in a manner to prefer performance. For instance, the OS may provide an EPP setting to indicate a workload category (e.g., foreground, background, real time, etc.).

In one embodiment, such EPP settings may follow the guidelines set forth for "energy/performance preference control" in documents such as the "Intel® 64 and IA-32 Architectures, Software Developer's Manual, Volume 3B:

System Programming Guide, Part 2" from September of 2016 (the "SDM"). For instance, as indicated on pages 14-8 and 14-9 of the SDM, an OS may write an EPP setting or value to bites 31:24 of an SPR referred to as the "IA32_HWP_REQUEST Register," with the value 0 indicating that maximum performance is preferred, and 0FFFxH indicating that maximum energy efficiency is preferred. However, for purposes of illustration, the present disclosure describes a hypothetical scenario in which processor 12 supports EPP settings of 0-10, with 0 indicating that maximum performance is preferred, and 10 indicating that maximum energy efficiency is preferred. EPP settings may also be referred to as "software hints." PMU 50 may automatically select the P-state for the cores based at least in part on those hints. For instance, for each core, PMU 50 may select the P-state based on the EPP settings and the current workload for that core, and then PMU control flows will apply that P-state to the core.

FIG. 1 uses dashed lines to indicate which power management settings pertain to which components. For instance, the dashed lines surrounding EPP register 23 indicate that the EPP setting in that register pertains to LP 22, and the dashed lines surrounding EPP register 25 indicate that the EPP setting in that register pertains to LP 24. Similarly, the dashed lines around core power management (CPM) register 52 indicate that the settings in CPM register 52 pertain to core 20A. As illustrated, processor 12 also provides an EPP register (EPPR) for each of the other LPs, and a CPM register for each of the other cores. Thus, the EPP registers contain per-LP power management settings, and the CPM registers contain per-core power management settings.

In addition, PMU 50 includes a global power management (GPM) register 54 for globally-applicable power management settings, as described in greater detail below. However, in other embodiments, a processor may use any suitable number of registers to store power management settings. For instance, all settings may be stored in a single register. Accordingly, for purposes of this disclosure, the term "register" may be used to refer to a portion of a register.

Since processor 12 supports per-core P-state, PMU 50 may be able to save power (relative to a processor that must use the same P-state for all cores) by running one or more cores at a relatively low P-state, while running one or more other cores at a relatively high P-state. In addition, by saving power, it may be possible to increase the frequency of a subset of the cores by using the power headroom saved on another subset of the cores.

In general, a PMU may select the P-state for each core based at least in part on the degree of core utilization for that core and the type of activity the core is doing. A PMU may also consider additional runtime conditions or properties, including recent utilization conditions such as the average number of actives cores. Selecting a suitable P-state for each core is a key requirement for extracting the potential efficiency benefits of per-core P-state capabilities. However, selecting the P-states which provide a desirable balance of performance and efficiency can be very challenging. As described in greater detail below, in addition to considering the degree of core utilization the type of core activity, PMU 50 may consider certain additional parameters when selecting the P-state for a core. Those considerations may enable processor 12 to operate with a desirable balance of performance and efficiency.

In general, when a developer creates an application using modern programming methods, the application may utilize multiple software threads to divide the work of the application between the threads, either to get better parallelism, to avoid serialization while working with input/output (I/O) devices or other system processes, to implement a producer-consumer pattern between different software components, to modulate the application, and for other reasons. Also, a processor may be concurrently executing multiple software threads which have interdependencies. For instance, when the OS migrates a thread between different cores, the migration process may create conditions which follow the producer-consumer pattern. In other words, the operations involved in the thread migration may follow the producer-consumer pattern.

When threads are interdependent, slowing down one of the threads can impact the overall application performance. For instance, when the P-state for each core is based on the degree of core utilization for that core, if a particular core is less loaded than the other cores, the processor may set that particular core to a low frequency. However, when another core is dependent on that low frequency core, that other core may end up waiting for the low frequency core, thereby slowing down the entire application. Consequently, using per-core P-state to set one or more cores to a relatively low P-state may cause performance degradation, compared to using the same relatively high P-state for all cores.

Whenever there are thread dependencies, it may be difficult for the processor to select a P-state that provides a desirable balance of performance and efficiency for all of the threads involved. An OS scheduler may have load balancing mechanisms that mitigate some of these issues. In particular, the mitigation from load balancing may be most effective when there are many symmetrical software threads. However, some workloads, such as those following the producer-consumer pattern, may cause the load balancing mechanism to make P-state decisions which do not provide a desirable balance of performance and efficiency.

One technique to ameliorate the potential performance degradation of per-core P-state is for the OS to specify the same EPP setting for all of the threads that are interdependent on each other, and for the processor to then use the same P-state for all of the threads in that group. In particular, for all cores that share the same EPP value, every core in that group will share the maximal P-state of the group. These kinds of techniques may be referred to in general as "EPP grouping." And in particular, when a processor uses the same P-state for all threads in an EPP group, that technique may be referred to as "basic EPP grouping."

For instance, with basic EPP grouping, when an EPP group includes multiple cores with multiple threads, the processor will determine preliminary P-states for all of those cores, based on factors such as the current conditions and the EPP settings for the LPs of those cores. The processor will then use the highest of those P-states for all of the cores. Additionally, even if the LPs on the core with the highest preliminary P-state enter an idle state, the processor may continue to use that P-state for the other cores. In other words, even if a thread is idle during its run time, the idle thread's P-state request should still be valid. Consequently, threads with interdependencies (e.g., due to thread migration, the producer-consumer pattern, etc.) may achieve good performance.

EPP grouping may be effective when multiple applications are executing concurrently, and each application specifies a different EPP value. However, if each application specifies the same EPP value, or if a single application uses the same EPP value for all of its threads, the processor may run all cores at the same P-state. In that case, come cores may consume more power that is necessary or desirable, and other cores may run slower than is desirable. Efficiency and/or performance may also suffer if the processor does not consider software hints such as EPP settings when determining the P-state for each core. Efficiency and/or performance may also suffer when the processor groups all of the cores together, even though the cores do not all have the same EPP settings.

A processor that supports per-core P-state might allow each core to select its own P-state, and that processor might not alter or tweak those P-states, based on factors associated with possible direct or in direct dependencies between the cores. However, if the processor does not alter or tweak those P-states, based on such factors, performance may suffer. For instance, as indicated above, performance may suffer if two cores are interdependent, and yet the processor nevertheless sets one of those cores to a P-state that is significantly lower than the P-state for the other core. EPP grouping is one technique that a processor may use to consider those types of dependencies. However, EPP grouping may cause the processor to be too aggressive with regard to increasing power consumption, in that the process may set the P-state of one or more cores at a level that is less efficient than necessary or desirable.

By contrast, a processor may use the techniques described herein to realize significant performance gains, with low or minimal loss of efficiency.

As described in greater detail below, processor 12 supports enhanced EPP grouping. Consequently, for each group of cores that have the same EPP, PMU 50 coordinates the P-states for those cores. However, instead of requiring all of those cores to use the same P-state, PMU 50 provides some level of flexibility to each core P-state request, in a way that increases or maximizes performance, relative to the basic EPP grouping model and relative to the monolithic P-state model, without causing an inordinate decrease in efficiency. In addition or alternatively, a processor may use techniques like those described herein to realize a desirable balance of performance and efficiency with cores that are organized into groups based on factors other than EPP settings.

Figure 2:
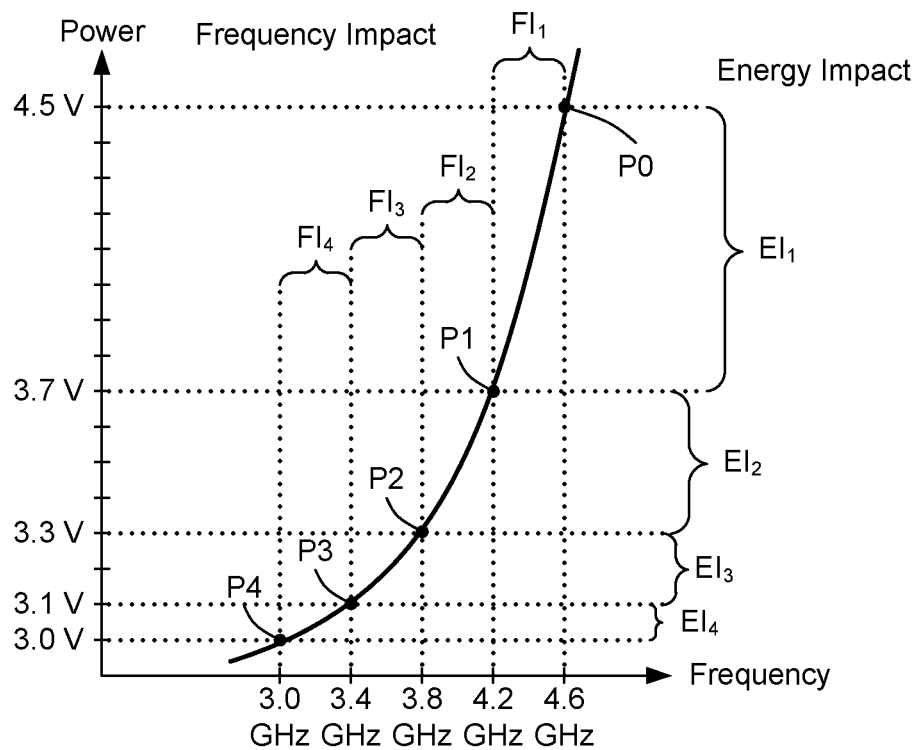
FIG. 2 is a graph depicting the relationship between power and frequency for a core in the processor of FIG. 1.

FIG. 2 is a graph depicting the relationship between power and frequency for a representative core in processor 12. As illustrated, higher frequencies require more power. Additionally, as frequency increases, greater amounts of power are needed to achieve a given amount of increase in frequency. In other words, the ratio of power over frequency for each P-state increases as the frequency increases. Consequently, the greatest relative power increase or decrease occurs when frequency is selected in the high range of frequencies supported by the core.

The power delta for shifting from one P-state to the next may be referred to as an energy impact (EI), and each consecutive change in frequency may be referred to as a frequency impact (FI). Also, since energy equals power multiplied by time, and time can be considered the inverse of performance, energy may be represented as power divided by performance. Accordingly, if the relative power decrement between two P-states is greater than the relative performance decrement, energy will be saved by using the lower of those P-states. In FIG. 2, five different P-states are depicted: P0-P4, with P0 being considered the highest P-state, because it has the highest frequency. Also, the EIs for shifting from each P-state to the next are illustrated as $EI_1$-$EI_4$, and the corresponding FIs are illustrated as $FI_1$-$FI_4$. In particular, for purposes of illustration, the core is shown as requiring an increase of 0.1 volts to shift from a frequency of 3.0 gigahertz (GHz) at P-state P4 to 3.4 GHz at P-state P3. Also, an increase of 0.2 volts is needed to shift from 3.4 GHz at P3 to 3.8 GHz at P2, an increase of 0.4 volts is needed to shift from 3.8 GHz at P2 to 4.2 GHz at P1, and an increase of 0.8 volts is needed to shift from 4.2 GHz at P1 to 4.6 GHz at P0. Thus, FI is constant or linear, while EI increases exponentially.

In addition, when voltage increases, core temperature also increases, at least in part due to transistor leakage effects, as well as the increase to the overall core power. In general, each core in processor 12 may behave according to the following power function (in which "CDYN" denotes dynamic capacitance):

$$\text{CorePower:=CDYN*voltage}^2\text{*Frequency+Leakage (Temperature, Frequency)}$$

In general, the core power of a core is related to the frequency of that core, and more specifically, the core power is a function of the voltage which corresponds to that frequency. In particular, power as a function of frequency is not linear but polynomial.

However, a given increase in core frequency typically does not result in a proportionate increase in overall performance, especially at higher frequencies.

Figure 3:
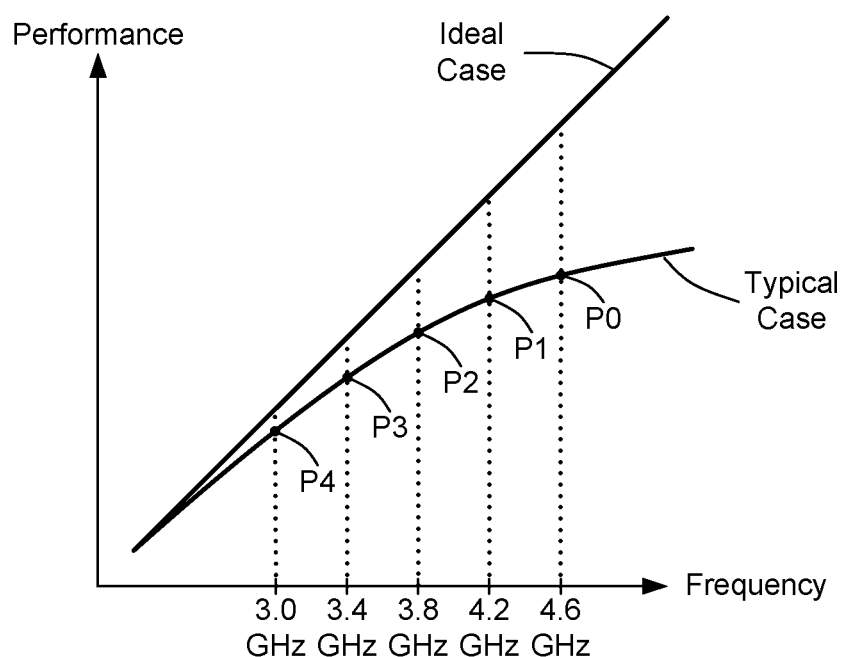
FIG. 3 is a graph depicting the relationship between performance and frequency for a typical workload on a core in the processor of FIG. 1.

FIG. 3 is a graph depicting the relationship between performance and frequency for a typical workload on a representative core in processor 12. In accordance with Amdahl's law, even when some aspects of the performance of an application are scalable with frequency, I/O operations generally are not impacted by frequency change. In addition, the performance of a workload is impacted by the intermediate scalability of the active thread for a given frequency change. Generally, this intermediate scalability is mostly a function of memory stalls. The negative impact of memory stalls and such is increased as the frequency is increased.

FIG. 3 depicts the relationship between performance and frequency for a hypothetical "ideal case" that involves no I/O, no memory stalls, and no other operations which do not scale with frequency. In the ideal case, performance is a linear function of the core frequency. FIG. 3 also depicts a "typical case" in which the performance impact of increasing frequency is mostly smaller than the ideal case, due to the typical workload including some operations which do not scale with frequency, such as I/O and memory stalls.

When FIGS. 2 and 3 are considered together, it becomes evident that, towards the upper range of frequency, any further increase in frequency will involve a significant increase in power consumption, to drive a relatively small increase in performance. By contrast, towards the lower range of frequency, any increase in frequency will involve only a small increase in power consumption, to drive a relatively large increase in performance. In other words, in the lowest portion of the frequency range for a core, if the core's frequency is increased, the amount of performance gained will be high, at the cost of a small increase in power. As indicated above, if the relative power decrement between two P-states is greater than the relative performance decrement, energy will be saved by using the lower of those P-states. But if the relative power increment between two P-states is smaller than the relative performance increment, energy will be saved by using the higher of those P-states.

The present disclosure introduces technology for managing per-core P-state in a way that increases performance without an inordinate decrease in efficiency, in accordance with the results described above concerning performance and power as a function of frequency. In other words, the present disclosure introduces technology for balancing performance and efficiency.

Referring again to FIG. 1, the features that processor 12 uses to balance performance and efficiency include GPM register 54, CPM register 52, and EPPRs such as EPP registers 23 and 25. As indicated above, PMU 50 uses CPM register 52 to specify core-specific power management settings, and PMU 50 uses GPM register 54 to specify globally-applicable power management settings. In particular, as FIG. 1 illustrates, CPM register 52 may include a core-level EPP, a preliminary frequency, and an optimized frequency. For each of those settings, the following list provides a symbol (in parentheses) and a brief description:

Core-level EPP—(E): The EPP that PMU 50 assigns to the core in general, based on resolution of the individual EPPs for the LPs of that core, as described in greater detail below.

Preliminary frequency—(P): A preliminary frequency assigned to the core by PMU 50, based on (E) and on other runtime factors, such as the current execution conditions. (Also known as (AKA) "Prelim_Freq_(P)" or just "(P)".)

Optimized frequency—(O): The frequency to be used by the core, once PMU 50 completes the frequency optimization process, when all cores are in the same EPP group. (AKA "Optimized-Freq_(O)" or just "(O)".)

Optimized frequency—(O'): The frequency to be used by the core, once PMU 50 completes the frequency optimization process, when all cores are not in the same EPP group. (AKA "Optimized-Freq_(O')" or just "(O')".)

These settings are further described below, with regard to FIGS. 5A-5B.

As FIG. 1 also illustrates, the settings in GPM register 54 may include a tuned frequency, a reduction factor, a maximum ("max") package preliminary frequency, a dynamic tuning frequency, a floor, and a bump. For each of those settings, the following list provides a symbol (in parentheses) and a brief description:

Tuned frequency—(T): A tuning frequency which, in some cases, causes PMU 50 to generate an optimized frequency that is higher than (P) or (D). (AKA "Tuned-Freq_(T)" or just "(T)".)

Reduction factor (R): A value between 0 and 1 (non-inclusive), used by PMU 50 to compute a dynamic tuning frequency (D) that is lower than (A). (AKA "Reduction-Factor_(R)" or just "(R)".)

Max package preliminary frequency—(A): The maximum preliminary frequency (P) assigned to a core by PMU 50, considering all of the cores in processor 12. (AKA "Max-Package-Prelim-Freq_(A)" or just "(A)".)

Dynamic tuning frequency (D): A dynamic tuning frequency based on (A) and (R)—specifically, (D):=(A)*(R). (AKA "Dyn-tuning-freq_(D)" or just "(D)".)

Floor—(F): A temporary value used by PMU 50 to determine (O).

Bump—(B): Another temporary value used by PMU 50 to determine (O).

In one embodiment or scenario, such as when all cores have the same EPP value, PMU 50 may use the above factors to optimize the frequency of each core.

In another embodiment or scenario, such as when the cores do not all have the same EPP value, PMU 50 may assign subsets of the cores to different groups, and PMU 50 may use different values to optimize the different groups. Alternatively, as indicated above, a PMU may assign subsets of cores to different groups based on other factors pertaining to performance interdependencies between cores. Nevertheless, for purposes of this disclosure, such groups may be referred to as "EPP groups." Accordingly, PMU 50 may use an EPP group data register 56 to compute and save different values for each different EPP group. In the embodiment of FIG. 1, EPP group data register 56 is a portion of GPM register 54. In other embodiments, the EPP group data register may be distinct from the GPM register.

In the embodiment of FIG. 1, for each EPP group, the values in EPP group data register 56 may include an EPP group identifier (ID), a list of the cores belong to that group, a max preliminary frequency, a dynamic tuning frequency, a floor, and a bump. In FIG. 1, the EPP group ID for the first EPP group is depicted as "EPP group $ID_1$" in one column, and an ellipsis is depicted in the next column, to indicate that additional groups will have the same kinds of data. The following list provides a symbol (in parentheses) and a brief description for some of the values or settings for each group:

Max group preliminary frequency—(A'): The maximum preliminary frequency (P) assigned to a core by PMU 50, considering all of the cores in the current EPP group. (Also known as (AKA) "Max-Group-Prelim-Freq_(A')" or just "A'").

Dynamic tuning frequency—(D'): A dynamic tuning frequency based on (A') and (R)—specifically, (D'):=(A')*(R). (AKA "Dyn-tuning-freq_(D')" or just "(D')".)

Floor—(F'): A temporary value used by PMU 50 to determine (O').

Bump—(B'): Another temporary value used by PMU 50 to determine (O'). (AKA "Bump_(B')" or just "(B')")

Accordingly, each EPP group could have a different max group preliminary frequency (A'), etc. The settings in GPM register 54 are further described below, with regard to FIGS. 5A-5B. Alternatively, an EPP group may be referred to as a "dependency group."

Figure 4:
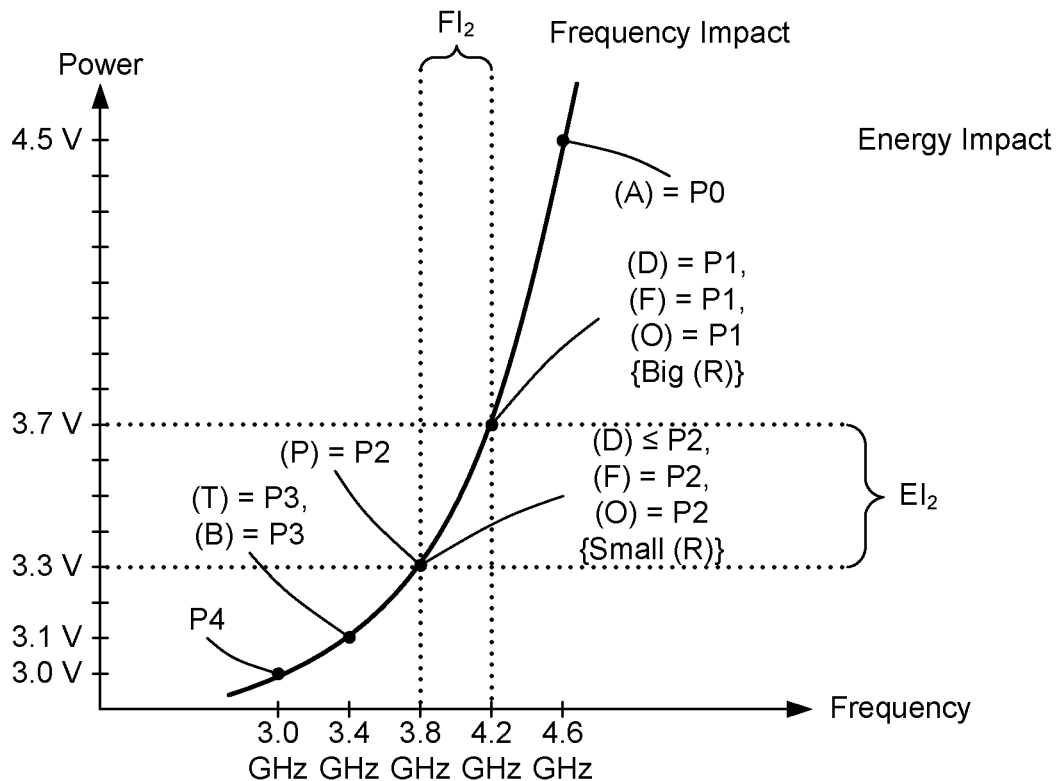
FIG. 4 is a graph depicting various performance management settings in the PMU of FIG. 1, in relation to various P-states, in an example scenario.

FIG. 4 is a graph depicting various example performance management settings in PMU 50, in relation to various P-states. In particular, FIG. 4 depicts settings for two different scenarios. At least one additional scenario is described below with regard to FIG. 6. The optimization process itself is described in greater detail below with regard to FIGS. 5A-5B.

Figure 5A:
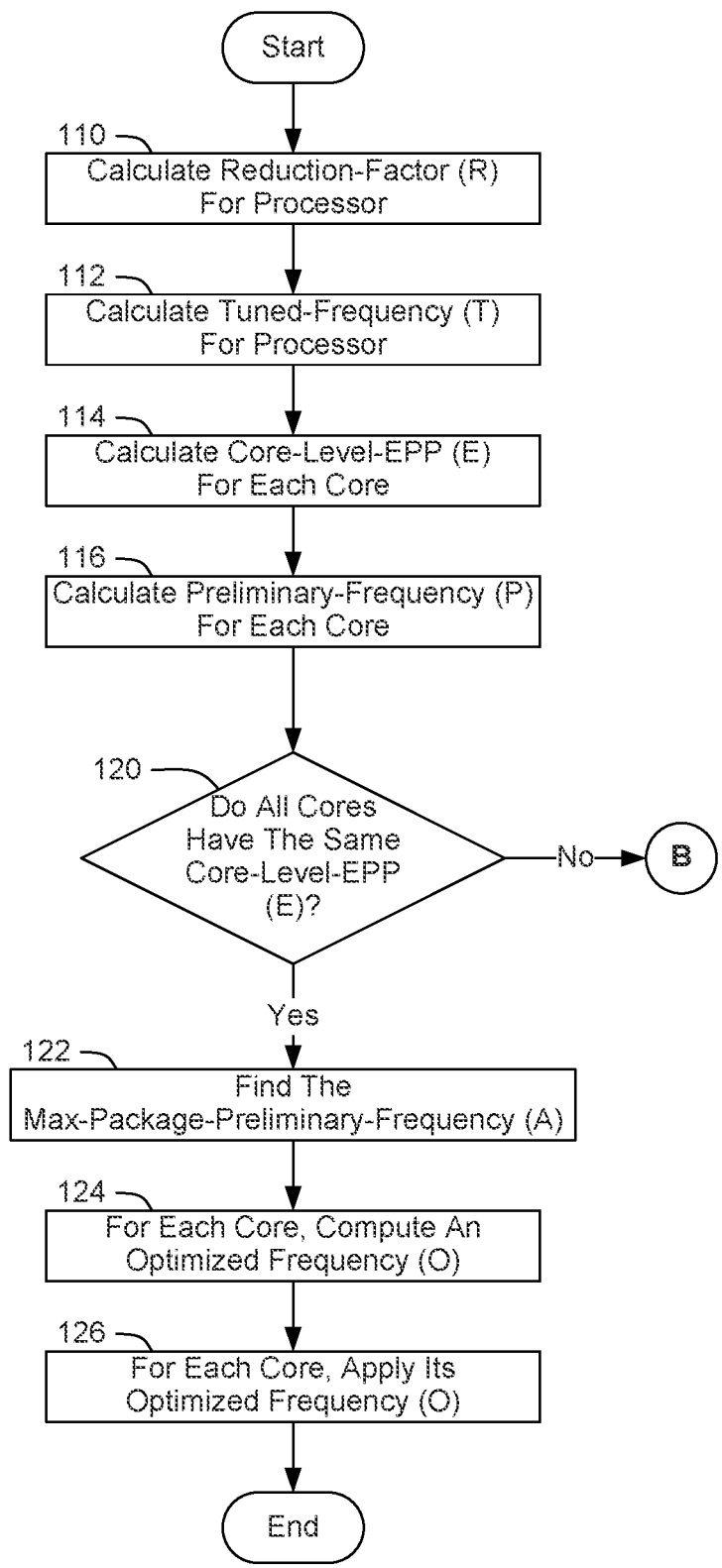
FIGS. 5A-5B present a flowchart of an example embodiment of a process for managing per-core P-state for efficiency.
Figure 5B:
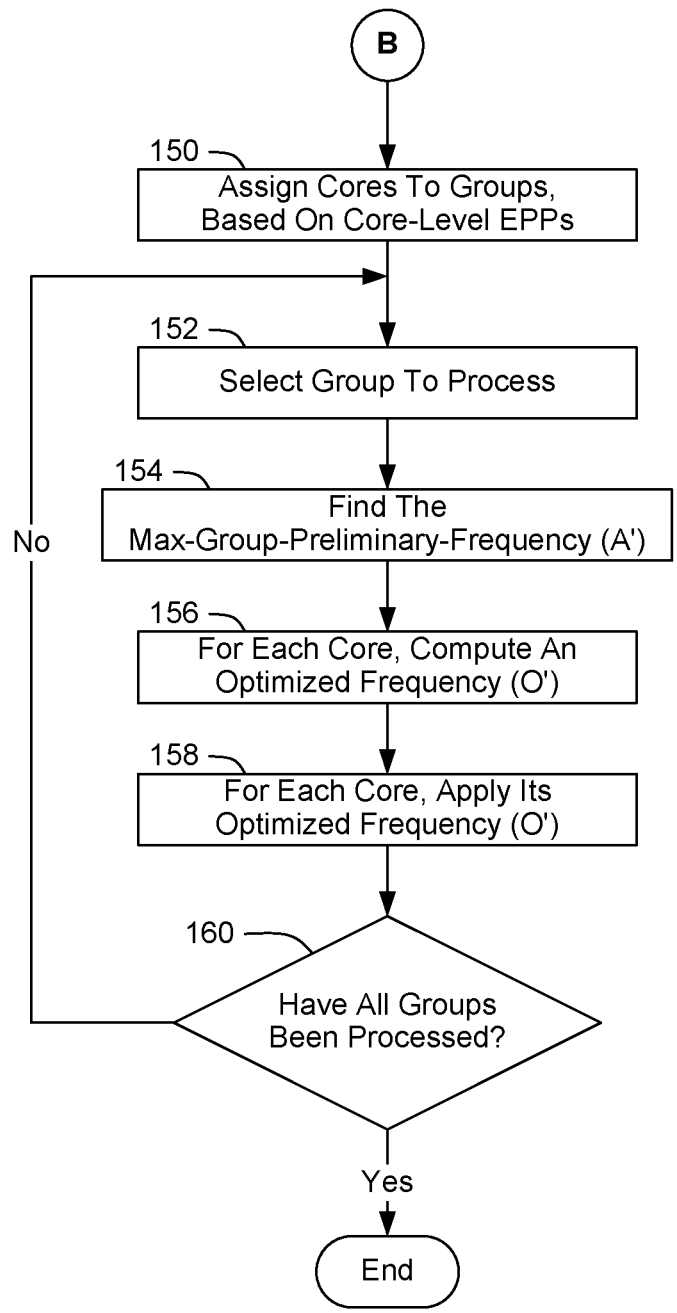

FIGS. 5A-5B present a flowchart of an example embodiment of a process for managing per-core P-state, in the context of data processing system 10. That process begins with PMU 50 calculating the reduction factor (R) to be used for optimizing the cores in processor 12, as shown at block 110. For instance, PMU 50 may compute (R) as a function of the types of workloads being processed by processor 12. Alternatively, (R) may be a static tuning factor for PMU 50, and PMU 50 may retrieve (R) from internal or external NVS.

PMU 50 may also calculate the tuning frequency (T), as shown at block 112. In one embodiment, PMU 50 includes heuristic control logic for determining (T) as a function of various relevant factors and conditions in processor 12. In particular, PMU 50 may compute (T) as a constant that tunes frequency as a function of the relationship of power to frequency, in order to enable a desirable or optimal balance of performance and efficiency. In generally, PMU 50 may set (T) to the lowest P-state that can be reached from a higher P-state without incurring an FI that is greater than the EI. Such a P-state may also be referred to as the minimal frequency where generating an optimized frequency (O) below this level would not realize significant energy savings. In other words, (T) denotes a threshold P-state, in that (a) a relative amount of power savings that would be saved by using the next lower P-state instead of using the threshold P-state is less than (b) the relative amount of performance that would be lost by using the lower P-state instead of using the threshold P-state. For instance, that relative amount of power savings may be expressed as a percentage or fraction, with the numerator being the amount of power saved and the denominator being the amount of power used at the threshold P-state. Similarly, that relative amount of performance lost may be expressed as a percentage or fraction, with the numerator being the change in frequency, and the denominator being the frequency at the threshold P-state.

PMU 50 also calculates the core-level EPP (E) for each core, based on the EPP for each LP in that core, as shown at block 114. For instance, in one embodiment or scenario, PMU 50 may compute (E) as the minimum of the core's LP EPPs, where "minimum" means the numerically lowest value (which actually corresponds to the highest performance preference, as indicated above). For example, PMU 50 may compute the (E) for core 20A as MIN(EPP register 23, EPP register 25). And in an embodiment with more than two LPs per core, the PMU may select the minimum EPP value for those LPs. Also, when one of the LPs is idle, PMU 50 may disregard that LP's EPP when computing (E).

When both (or all) LPs of a core are idle, PMU 50 may respond differently in different embodiments or scenarios. For instance, in one embodiment or scenario, PMU 50 may compute (E) based on the EPP of the LP that was last active. In another embodiment or scenario, PMU 50 may compute (E) based on the EPPs for all of the LPs in the core, even though those LPs are idle, thereby implementing a bias for performance.

Also, as shown at block 116, PMU 50 calculates a preliminary frequency (P) for each core in processor 12. As indicated above, PMU 50 calculates the (P) for each core as a function of the core-level EPP (E) for that core, as well as other individual runtime parameters or conditions pertaining to that core. In one embodiment or scenario, the control logic that PMU 50 uses to determine (P) tends to be conservative, in that the control logic tends to select a (P) with a relatively low P-state. However, this approach typically does not ultimately result in an undesirably low level of performance for the core, because other parts of the process for determining the ultimate P-state for the core tend to bump the P-state up to a higher level when conditions indicate that a higher level of performance would likely be desirable. For instance, with regard to FIG. 4, PMU 50 may set the preliminary frequency (P) to P2. However, as described in greater detail below, other parts of the process for determining the ultimate P-state may then bump up the ultimate P-state to P1. For instance, as described in greater detail below, PMU 50 may bump the P-state up higher than (P) when at least one other core has a P-state that is higher than (P). And more specifically, PMU 50 may bump up the P-state when at least one other core has a P-state that is so much higher than (P) that the higher P-state remains higher than (P) even after the higher state is reduced by the reduction factor (R).

Referring again to FIG. 5A, as shown at block 120, PMU 50 may then determine whether all of the cores have the same core-level EPP (E). If they do not, the process may pass through page connector B to FIG. 5B. If they do, PMU 50 may determine the max package preliminary frequency (A), based on the preliminary frequency (P) that was assigned to each core in processor 12, as shown at block 122.

Then, as shown at blocks 124 and 126, PMU 50 may compute an optimized frequency (O) for each core, as described in greater detail below, and PMU 50 may apply those optimized frequencies to the cores. Each core may then run at its optimized frequency (O). The process of FIG. 5A may then end. However, some operations may be repeated when conditions change. For instance, PMU 50 may perform the operations from blocks 112 or 114 through 126 whenever certain conditions within processor 12 change (e.g., when the OS changes the EPP for an LP, etc.).

Referring again to block 124, to compute the optimized frequency (O) for a core, PMU 50 may use a set of optimization operations such as the following:
   I. Dyn-Freq_(D):=Max-Package-Prelim-Freq (A)*Reduction-Factor (R);
   II. Floor_(F):=MAX(Dyn-Freq (D), Prelim-Freq (P));
   III. Bump_(B):=MIN(Tuned-Freq_(T), Max-Package-Prelim-Freq_(A)); and
   IV. Optimized-Freq_(O):=MAX(Floor_(F), Bump_(B)).

Consequently, PMU 50 establishes floor frequency value which is at least at the level of (P), and PMU 50 causes the core to apply that floor frequency to the core in some cases, and to use a higher frequency in other cases. In particular, PMU 50 may use a frequency higher than (P) when doing so is likely to realize performance gains which outweigh the energy cost of using the increased frequency, particularly when core interdependencies are involved.

According to the above optimization operations, (O) will always be greater than or equal to (P), because of operations II and IV. And if (D) is greater than (P), (O) will always be greater than or equal to (D), also because of operations II and IV.

Referring again to FIG. 4, the depicted scenario involves the following conditions: (P) for the current core is at P2, (A) is at P0, and (T) is at P3. Consequently, in this scenario ("scenario A"), PMU 50 will use the above formulas to generate the following results:
   Dyn-Freq_(D) will be less than (A) (i.e., <P0), but it could also be greater than (P), equal to (P), or less than (P), depending on (R).
   Bump_(B) will be (T)=P3, since (T)<(A) in this scenario.
   Floor_(F) is MAX(Dyn-Freq_(D), Prelim-Freq_(P)). So, that result depends on whether (D) is greater than (P) or less than (P), which in this scenario boils down to whether (D) is greater than P2 or less than P2. And (D) depends on the value of (R). A large (R) could produce (D)=P1. A smaller (R) could produce (D)=P2 or less.
      a. If (D) is greater than P2 (i.e., if (D) is P1), then (F) will be (D)=P1.
      b. If (D) is less than P2 (e.g., if (D) is P3 or P4), then (F) will be (P)=P2.
   Optimized-Freq_(O) is MAX(Floor_(F), Bump_(B)). However, (B) is at P3, while (F) is greater than P3, being at either P1 and P2, depending on (D). So, (O) in this case depends on (F), which depends on (D) and (P). Specifically:
      a. If (R) does not reduce (A) more than a certain amount, then (D) and (F) will be at P1, and therefore so will (O). (This result is shown in FIG. 4 as "(O)=P1 {Big (R)}".)
      b. By contrast, if (R) reduces (A) to the same level as (P) (or below), then (F) will equal (P)=P2, and so will (O). (This result is shown in FIG. 4 as "(O)=P2 {Big (R)}".)

Thus, in scenario A (which actually covers two closely related scenarios), PMU 50 will generate an optimized frequency of either P1 or P2 for the present core, depending on whether or not (D) is greater than (P). Scenario A with (D) greater than (P) may be referred to as "scenario A1," and Scenario A with (D) less than or equal to (P) may be referred to as "scenario A2."

Specifically, in scenario A1, the optimization enables (O) to be lower than the max package preliminary frequency (A), and in this way, the optimization saves power, compared to a PMU that simply runs all cores at (A) (which, by definition, is the highest (P)). In particular, in scenario A1, PMU 50 limits (O) to no more than the ratio of (A) produced by (R). Thus, PMU 50 uses (R) to control or limit the negative performance impact, compared to a PMU that simply runs all cores at (A).

In scenario A2, the optimization enables to the core to run at its preliminary frequency, because (P) is higher than maximal allowed ratio from the group frequency (A).

Figure 6:
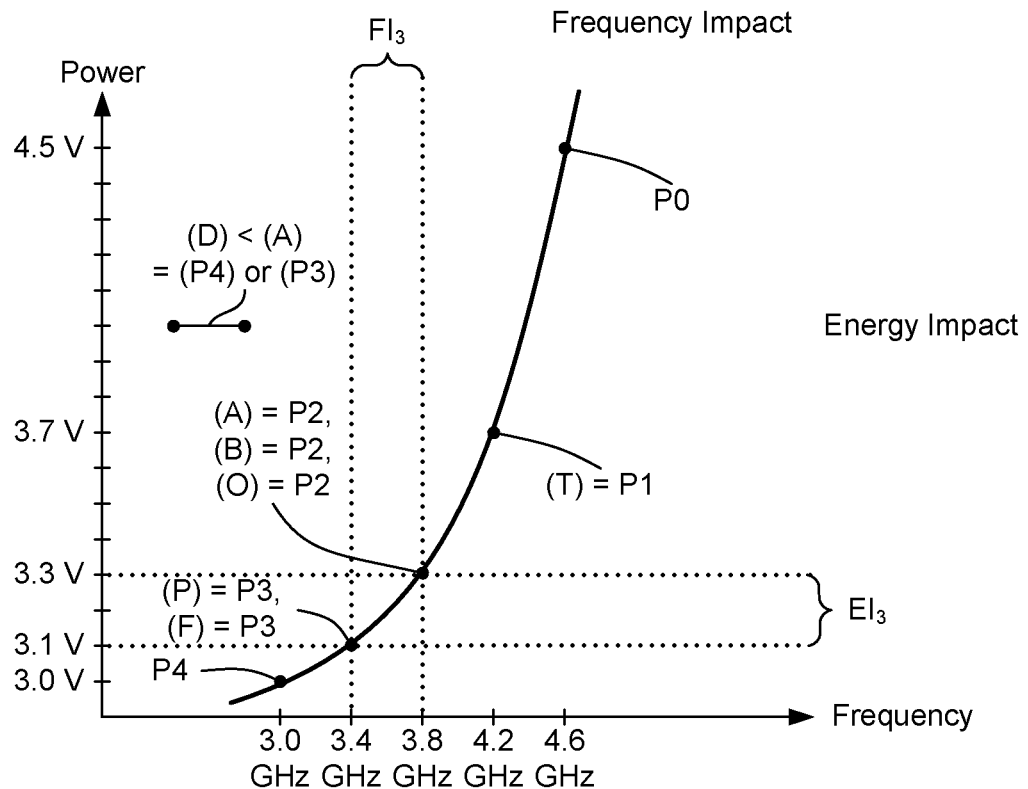
FIG. 6 is a graph depicting various performance management settings in the PMU of FIG. 1, in relation to various P-states, in another example scenario.

FIG. 6 is a graph depicting various performance management settings in PMU 50, in relation to various P-states, in another example scenario. In particular, FIG. 6 depicts a scenario with the following conditions: (P) for the current core is at P3, (A) is at P2, and (T) is at P1. Consequently, in this scenario ("scenario B"), PMU 50 will use the above formulas to generate the following results:

Dyn-Freq_(D) will be less than (A) (i.e., <P2), and it could also be less than or equal to (P) (i.e. <P3), depending on (R).
Bump_(B) will be (A)=P2, since (A)<(T) in this scenario.
Floor_(F) is MAX(Dyn-Freq_(D), Prelim-Freq_(P)). And in this scenario, (D) is less than or equal to (P), so (F) will be (P)=P3.
Optimized-Freq_(O) is MAX(Floor_(F), Bump_(B)). And, (B) is at P2, while (F) is at P3. Therefore, (O) will be (B)=P2.

Thus, PMU 50 will set the frequency for the present core at the optimized frequency of P2, instead of at the preliminary frequency of P3.

This example shows that, when the system max core frequency (A) is below the tunable value (T), the core will be set to (A). PMU 50 applies that result, rather than using a lower (P) or (D) frequency, because (T) denotes the threshold P-state below which the value of saving power is less than the cost in performance to use a lower P-state. In other words, below tuned frequency (T), the value of saving power is not sufficient to outweigh the amount of performance lost, as indicated above. Consequently, using a lower (O) or (D) is unlikely to improve the balance of efficiency and performance. Accordingly, in one embodiment or scenario, when (A) is less than (T), PMU 50 may omit the optimized operations for computing (D) and such, and simply set (O):=(A).

Referring again to block 120 of FIG. 5A, if all of the cores do not have the same core-level EPP (E), the process may pass through page connector B to FIG. 5B, as indicated above. PMU 50 may then generate an optimized frequency (O) for each core in each group.

In particular, PMU 50 may split the cores into groups, based on the core-level EPP of each core, so that all of the cores that have the same core-level EPP get assigned to the same group, as shown at block 150. PMU 50 may then select the first group (or next group) of cores to process, as shown at block 152. PMU 50 may then determine the max group preliminary frequency (A') for the selected group, as shown at block 154. In other words, PMU 50 finds the maximal frequency request for the group, considering all of the cores in the group.

Then, as shown at block 156, for each core in the group, PMU 50 may compute an optimized frequency (O'), as described in greater detail below. And as shown at block 158, PMU 50 may apply those optimized frequencies to the cores in the groups. As shown at block 160, PMU 50 may then determine whether all of the groups have been processed. If they have, the process may then end, potentially to be performed again when conditions change, as indicated above. If all groups have not been processed, the process may return to block 152 with PMU 50 selecting the next group and processing it, as indicated above.

Referring again to block 156, PMU 50 may use formulas such as the following to compute an optimized frequency (O') for each core in a group:

I. Dyn-Freq_(D'):=Max-Group-Prelim-Freq (A)*Reduction-Factor_(R);
II. Floor_(F):=MAX(Dyn-Freq_(D'), Prelim-Freq_(P));
III. Bump_(B'):=MIN(Tuned-Freq_(T), Max-Group-Prelim-Freq_(A)); and
IV. Optimized-Freq_(O'):=MAX(Floor_(F), Bump_(B')).

And PMU 50 may apply those formulas in the same manner as described above to set the frequency for each core in the EPP group.

Moreover, the formulas immediately above may be considered to be generally applicable, and may be used when all of the cores have the same core-level EPP (E). In such a case, the cores may simply all be considered as belonging to the same group.

In view of the above formula and the other constraints described herein, there are only a limited number of valid ordered combinations of (T), (P), (D), and (A). For one thing, (D) will always be less than (A). Also, (P) will always be ≤(A). (B) will always be ≤(A), as well. However, the relative position of (T) relative to (P), (D), and (A) may be indeterminate. Also, the locations of (P) and (D), relative to each other, may be indeterminate This situation may be summarized with the following expressions and order lists (in which the symbols above are used without parentheses, and the symbols are placed in order from left to right in accordance with their required relationships):

D<A, therefore the ordered list DA represents a potentially valid relationship.
P≤A, therefore the ordered list PA represents a potentially valid relationship.
The ordered list DPA represents a potentially valid relationship.
The ordered list PDA represents a potentially valid relationship.
B≤A.
T=?.

In the list above, "?" indicates that the relative position of T is indeterminate.

By plugging T into every possible position in the ordered lists DPA and PDA, one may derive the ordered lists in the following table. Those eight ordered lists correspond to eight different scenarios. In addition, that table illustrates the results that would be derived by the above formulas for each of those scenarios.

TABLE 1

Ordered lists of optimization settings for different scenarios.

| TPDA | PTDA | PDTA | PDAT |
|---|---|---|---|
| F := D | F := D | F := D | F := D |
| B := T | B := T | B := T | B := A |
| O := D | O := D | O := T | O := A |

| TDPA | DTPA | DPTA | DPAT |
|---|---|---|---|
| F := P | F := P | F := P | F := P |
| B := T | B := T | B := T | B := A |
| O := P | O := P | O := T | O := A |

Furthermore, scenario "TPDA" matches the scenario A1 (discussed above with regard to FIG. 4), in which (T)<(P) <(D)<(A). And scenario "TDPA" matches scenario A2, in which (T)<(D)<(P)<(A). Also, scenario "DPAT" matches the scenario B (discussed above with regard to FIG. 6), in which (D)≤(P)<(A)<(T).

As indicated in Table 1 for the scenarios "DPAT" and "PDAT," PMU 50 returns the maximum frequency of the group as the core optimal frequency when that maximum frequency of the group is below the tuned frequency. In other words, if (A)<(T), then (O):=(A). As indicated above, PMU 50 is configured to operate this way because the amount of power saving below the tuned frequency (T) is relatively low, compared to at least one upper interval of frequency.

Also, for the same reason, when (T) is less than (A), the optimized frequency (O) will not be less than (T), as indicated for the other six scenarios in Table 1.

Also, as indicated in all eight scenarios, optimized frequency (O) will not be less than preliminary frequency (P), in order to ensure that the core is able to supply at least the level performance that corresponds to the factors considered by PMU 50 when deriving (P). For instance, scenarios "TDPA" and "DTPA" show PMU 50 assigning (O):=(P) when (P)>(D).

Also, as indicated in all eight scenarios, optimized frequency (O) will not be less than dynamic tuning frequency (D) (which may also be referred to as "the relative frequency derived from the max frequency of the group"), in order to ensure that the core is able to supply at least a level performance that corresponds to a proportion of the maximum frequency of the group. PMU 50 thereby supports at least a certain minimum level of overall performance, whiel also reducing or eliminating the likelihood of one core running too slowly to keep up with another core when those cores are interdependent. Scenarios TPDA and PTDA, for instance, show PMU 50 assigning (O):=(D) when (D)>(P).

By using the optimization techniques described herein, data processing system 10 may realize a better balance of performance and efficiency than would another data processing system that simply sets all of the cores of an EPP group to the same frequency. For instance, with some workloads, data processing system 10 may realize a decrease in power consumption of about 3% to 5%, with a reduction in performance of only about 1%.

Additional Embodiments:

FIGS. 7-11 are block diagrams of exemplary computer architectures. The same or similar elements in FIGS. 7-11 bear like reference numerals. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 7:
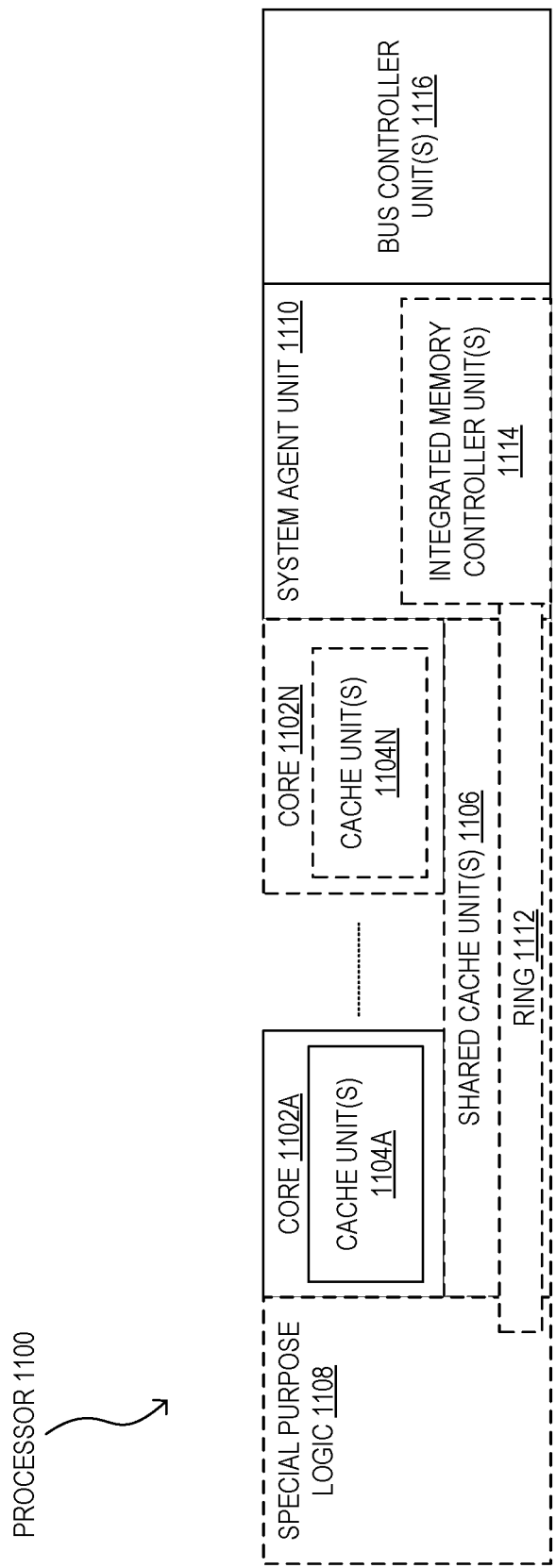
FIG. 7 is a block diagram of a processor that may have more than one core, may have an integrated memory controller, and may have integrated graphics according to embodiments of the invention.

FIG. 7 is a block diagram of a processor 1100 that may have more than one core, may have an integrated memory controller, and may have integrated graphics according to embodiments of the invention. The solid lined boxes in FIG. 7 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU, a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache units 1104A-N within the cores, a set or one or more shared cache units 1106, and external memory (not shown) coupled to the set of integrated memory controller units 1114. The set of shared cache units 1106 may include one or more mid-level caches, such as L2, level 3 (L3), level 4 (L4), or other levels of cache, a last level cache (LLC), and/or combinations thereof. While in one embodiment a ring based interconnect unit 1112 interconnects the special purpose logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102 A-N.

The system agent unit 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set. Such cores 1102A-N may convert certain memory access instructions into subline memory access instructions as described herein.

Figure 8:
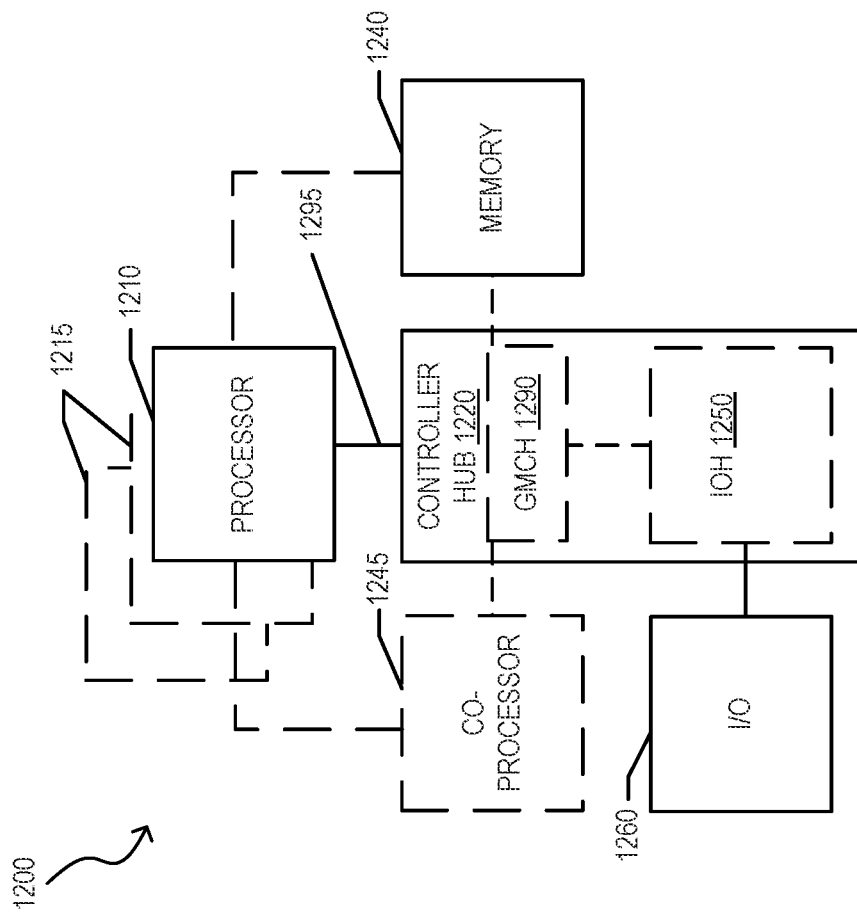
FIG. 8 is a block diagram of a system according to embodiments of the invention.

FIG. 8 is a block diagram of a system 1200 according to embodiments of the invention. The system 1200 may include one or more processors 1210, 1215, which are coupled to a controller hub 1220. In one embodiment, the controller hub 1220 includes a graphics memory controller hub (GMCH) 1290 and an Input/Output Hub (IOH) 1250 (which may be on separate chips); the GMCH 1290 includes a memory controller to control operations within a coupled memory and a graphics controller to which are coupled memory 1240 and a coprocessor 1245; the IOH 1250 couples input/output (I/O) devices 1260 to the GMCH 1290. Alternatively, one or both of the memory and graphics controllers are integrated within the processor, the memory 1240 and the coprocessor 1245 are coupled directly to the processor 1210, and the controller hub 1220 is in a single chip with the IOH 1250.

The optional nature of additional processors 1215 is denoted in FIG. 8 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 9:
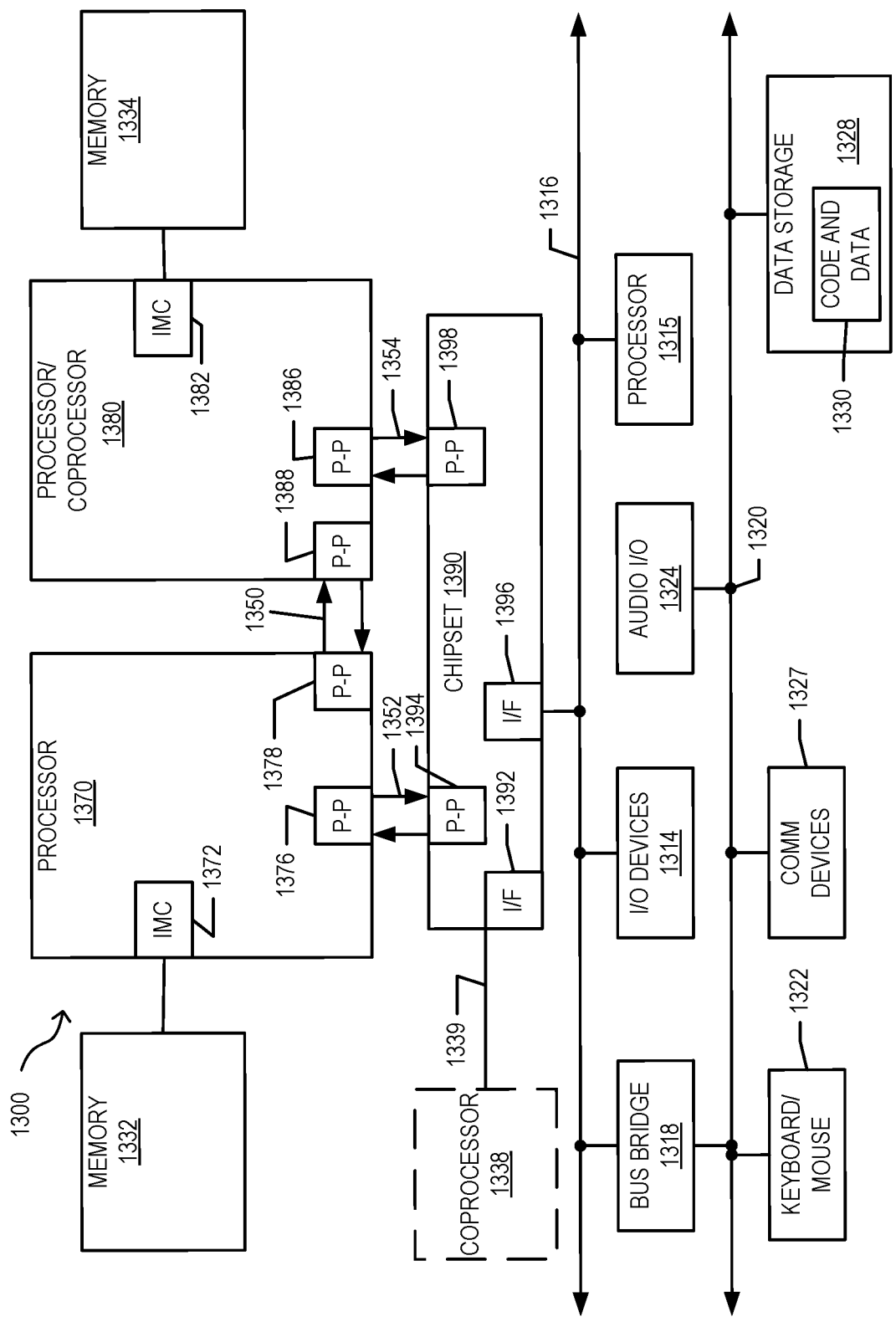
FIGS. 9 and 10 are block diagrams of more specific exemplary systems according to embodiments of the invention.
Figure 10:
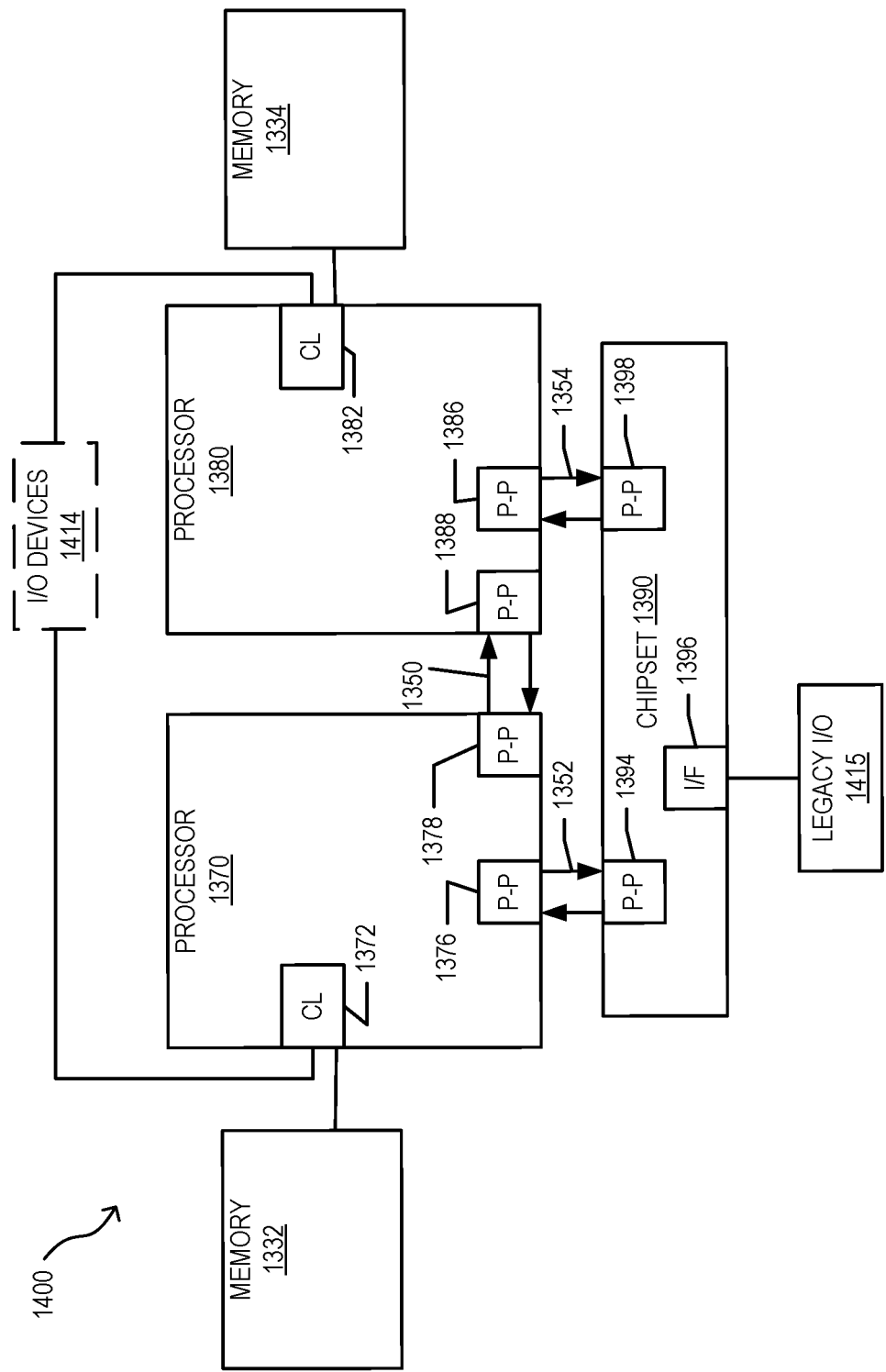

FIGS. 9 and 10 are block diagrams of more specific exemplary systems 1300 and 1400 according to embodiments of the invention. As shown in FIG. 9, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 and coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a P-P interface 1350 using P-P interface circuits 1378, 1388. As shown in FIG. 9, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 9, various I/O devices 1314 may be coupled to first bus 1316, along with a bus bridge 1318 which couples first bus 1316 to a second bus 1320. In one embodiment, one or more additional processors 1315, such as coprocessors, high-throughput MIC processors, GPGPUs, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 9, a system may implement a multi-drop bus or other such architecture.

FIG. 10 presents a block diagram of a second more specific exemplary system 1400 in accordance with an embodiment of the present invention. Certain aspects of FIG. 9 have been omitted from FIG. 10 in order to avoid obscuring other aspects of FIG. 10.

FIG. 10 illustrates that the processors 1370, 1380 may include integrated memory and I/O control logic ("CL") 1372 and 1382, respectively. Thus, the CL 1372, 1382 include integrated memory controller units and include I/O control logic. FIG. 10 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 11:
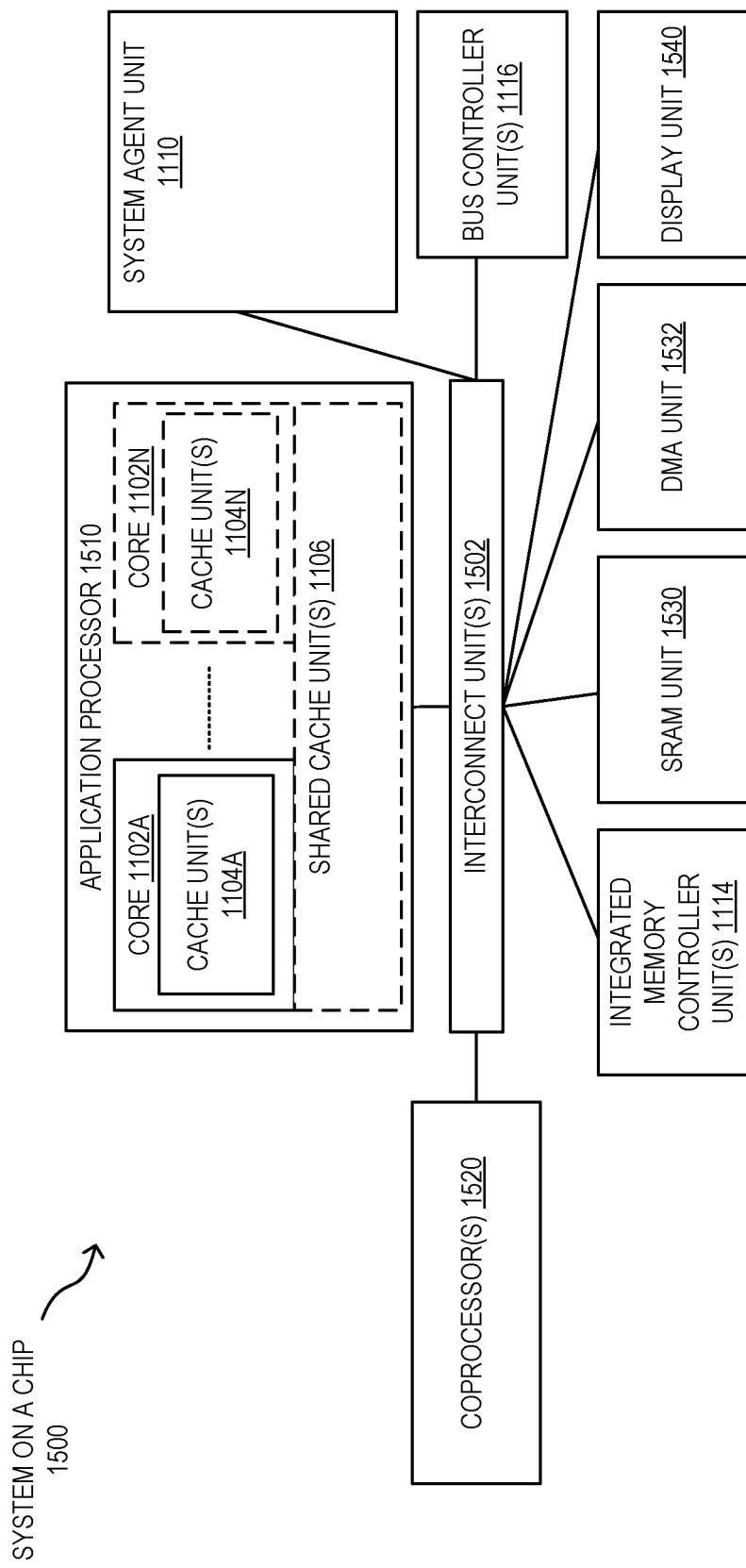
FIG. 11 is a block diagram of a system on a chip according to embodiments of the invention.

FIG. 11 is a block diagram of a system on a chip (SoC) 1500 according to embodiments of the invention. Dashed lined boxes are optional features on more advanced SoCs. In FIG. 11, an interconnect unit(s) 1502 is coupled to: an application processor 1510 which includes a set of one or more cores 1102A-N (including constituent cache units 1104A-N) and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Conclusion

In the present disclosure, expressions such as "an embodiment," "one embodiment," and "another embodiment" are meant to generally reference embodiment possibilities. Those expressions are not intended to limit the invention to particular embodiment configurations. As used herein, those expressions may reference the same embodiment or different embodiments, and those embodiments are combinable into other embodiments. In light of the principles and example embodiments described and illustrated herein, it will be recognized that the illustrated embodiments can be modified in arrangement and detail without departing from the principles described and/or illustrated herein.

Also, according to the present disclosure, a device may include instructions and other data which, when accessed by a processor, cause the device to perform particular operations. For purposes of this disclosure, instructions which cause a device to perform operations may be referred to in general as software. Software and the like may also be referred to as control logic. Software that is used during a boot process may be referred to as firmware. Software that is stored in nonvolatile memory may also be referred to as firmware. Software may be organized using any suitable structure or combination of structures. Accordingly, terms like program and module may be used in general to cover a broad range of software constructs, including without limitation application programs, subprograms, routines, functions, procedures, drivers, libraries, data structures, processes, microcode, and other types of software components. Also, it should be understood that a software module may include more than one component, and those components may cooperate to complete the operations of the module. Also, the operations which the software causes a device to perform may include creating an operating context, instantiating a particular data structure, etc. Embodiments may be implemented as software to execute on a programmable system comprising at least one processor, a storage system (e.g., volatile memory and/or one or more non-volatile storage elements), at least one input device, and at least one output device.

Any suitable operating environment and programming language (or combination of operating environments and programming languages) may be used to implement software components described herein. For example, program code may be implemented in a high-level procedural or object oriented programming language, or in assembly or machine language. The mechanisms described herein are not limited to any particular programming language. In any case, the language may be a compiled or interpreted language.

A medium which contains data and which allows another component to obtain that data may be referred to as a machine-accessible medium or a machine-readable medium. Accordingly, embodiments may include machine-readable media containing instructions for performing some or all of the operations described herein. Such media may be referred to in general as apparatus and in particular as program products. In one embodiment, software for multiple components is stored in one machine-readable medium. In other embodiments, two or more machine-readable media may be used to store the software for one or more components. For instance, instructions for one component may be stored in one medium, and instructions another component may be stored in another medium. Or a portion of the instructions for one component may be stored in one medium, and the rest of the instructions for that component (as well instructions for other components), may be stored in one or more other media. Similarly, software that is described above as residing on a particular device in one embodiment may, in other embodiments, reside on one or more other devices. For instance, in a distributed environment, some software may be stored locally, and some may be stored remotely. Similarly, operations that are described above as being performed on one particular device in one embodiment may, in other embodiments, be performed by one or more other devices.

Other embodiments may be implemented in data and may be stored on a non-transitory storage medium, which if used by at least one machine, causes the at least one machine to fabricate at least one integrated circuit to perform one or more operations according to the present disclosure. Still further embodiments may be implemented in a computer readable storage medium including information that, when manufactured into an SoC or other processor, is to configure the SoC or other processor to perform one or more operations according to the present disclosure. One or more aspects of at least one embodiment may be implemented by representative instructions, stored on a machine-readable medium, which represent various logic units within the processor, and which, when read by a machine, cause the machine to fabricate logic units to perform the techniques described herein. The instructions representing various logic units may be referred to as "IP cores," and they may be stored on a tangible, machine readable medium and supplied to various customers or manufacturing facilities to load into the fabrication machines that actually make the logic units or the processor. One or more aspects of at least one embodiment may include machine-readable media containing instructions or design data which defines structures, circuits, apparatuses, processors and/or system features described herein. For instance, design data may be formatted in a hardware description language (HDL).

The machine-readable media for some embodiments may include, without limitation, tangible non-transitory storage components such as magnetic disks, optical disks, magneto-optical disks, dynamic random access memory (RAM), static RAM, read-only memory (ROM), solid state drives (SSDs), phase change memory (PCM), etc., as well as processors, controllers, and other components that include data storage facilities. For purposes of this disclosure, the term "ROM" may be used in general to refer to nonvolatile memory devices such as erasable programmable ROM (EPROM), electrically erasable programmable ROM (EEPROM), flash ROM, flash memory, etc.

It should also be understood that the hardware and software components depicted herein represent functional elements that are reasonably self-contained so that each can be designed, constructed, or updated substantially independently of the others. In alternative embodiments, components may be implemented as hardware, software, or combinations of hardware and software for providing the functionality described and illustrated herein. For instance, in some embodiments, some or all of the control logic for implementing some or all of the described operations may be implemented in hardware logic (e.g., as microcode in an integrated circuit chip, as a programmable gate array (PGA) in a chip, as an application-specific integrated circuit (ASIC) in a chip, as any other suitable type of hardware circuitry in a chip, or as a combination of two or more different instances and/or types of hardware logic in one or more chips). Also, terms such as "circuit" and "circuitry" may be used interchangeably herein. Those terms and terms like "logic" may be used to refer to analog circuitry, digital circuitry, hard-wired circuitry, programmable circuitry, processor circuitry, microcontroller circuitry, hardware logic circuitry, state machine circuitry, any other type of hardware component, or any suitable combination of hardware components.

Additionally, the present teachings may be used to advantage in many different kinds of data processing systems. Such data processing systems may include, without limitation, accelerators, systems on a chip (SOCs), wearable devices, handheld devices, smartphones, telephones, entertainment devices such as audio devices, video devices, audio/video devices (e.g., televisions and set-top boxes), vehicular processing systems, personal digital assistants (PDAs), tablet computers, laptop computers, portable computers, personal computers (PCs), workstations, servers, client-server systems, distributed computing systems, supercomputers, high-performance computing systems, computing clusters, mainframe computers, mini-computers, and other devices for processing or transmitting information. Accordingly, unless explicitly specified otherwise or required by the context, references to any particular type of data processing system (e.g., a PC) should be understood as encompassing other types of data processing systems, as well. A data processing system may also be referred to as an apparatus. The components of a data processing system may also be referred to as apparatus.

Also, unless expressly specified otherwise, components that are described as being coupled to each other, in communication with each other, responsive to each other, or the like need not be in continuous communication with each other and need not be directly coupled to each other. Likewise, when one component is described as receiving data from or sending data to another component, that data may be sent or received through one or more intermediate components, unless expressly specified otherwise. In addition, some components of the data processing system may be implemented as adapter cards with interfaces (e.g., a connector) for communicating with a bus. Alternatively, devices or components may be implemented as embedded controllers, using components such as programmable or non-programmable logic devices or arrays, ASICs, embedded computers, smart cards, and the like. For purposes of this disclosure, the term "bus" includes pathways that may be shared by more than two devices, as well as point-to-point pathways. Similarly, terms such as "line," "pin," etc. should be understood as referring to a wire, a set of wires, or any other suitable conductor or set of conductors. For instance, a bus may include one or more serial links, a serial link may include one or more lanes, a lane may be composed of one or more differential signaling pairs, and the changing characteristics of the electricity that those conductors are carrying may be referred to as signals on a line. Also, for purpose of this disclosure, the term "processor" denotes a hardware component that is capable of executing software. For instance, a processor may be implemented as a central processing unit (CPU), a processing core, or as any other suitable type of processing element. A CPU may include one or more processing cores, and a device may include one or more CPUs.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

Similarly, components which have been described as residing within other components in an example embodiment may be arranged differently in alternative embodiments. For instance, at least some of the components described above as residing in a PMU may not reside in a PMU in alternative embodiments.

Embodiments include the following examples:

Example A1 is a processor comprising multiple cores and power management control logic to: (a) determine a preliminary frequency for each of the cores; (b) determine a maximum frequency, based on the preliminary frequencies; (c) determine a dynamic tuning frequency, based on the maximum frequency and a reduction factor; (d) in response to the dynamic tuning frequency for a selected core among the cores being greater than the preliminary frequency for the selected core, set the selected core to a frequency that is at least equal to the dynamic tuning frequency; and (e) in response to the preliminary frequency for the selected core being greater than the dynamic tuning frequency for the selected core, set the selected core to a frequency that is at least equal to the preliminary frequency.

Example A2 is a processor according to Example A1, wherein the power management control logic is further to (1) determine a bump frequency for the selected core, based on the maximum frequency; and (2) in response to the bump frequency being (a) greater than the preliminary frequency for the selected core, and (b) greater than the dynamic tuning frequency for the selected core, set the selected core to a frequency that is at least equal to the bump frequency.

Example A3 is a processor according to Example A2, wherein the bump frequency for the selected core is also based on a tuned frequency which corresponds to a threshold P-state, in that (a) a relative amount of power savings that would be saved by using a next lower P-state instead of using the threshold P-state is less than (b) a relative amount of performance that would be lost by using the lower P-state instead of using the threshold P-state.

Example A4 is a processor according to Example A3, wherein the power management control logic is to set the bump frequency at the lesser of (a) the maximum frequency and (b) the tuned frequency.

Example A5 is a processor according to Example A1, wherein: (a) the multiple cores comprise a first set of cores and a second set of cores; (b) the operation of determining a preliminary frequency for each of the cores comprises determining the preliminary frequency for each of the cores in the first set of cores and for each of the cores in the second set of cores; and (c) the maximum frequency comprises a first maximum frequency that is based on the preliminary frequencies for the first set of cores. Example A5 may also include the features of any one or more of Examples A2-A4.

Example A6 is a processor according to Example A5, wherein the power management control logic is to: (a) determine a second maximum frequency, based on preliminary frequencies for the second set of cores; (b) utilize the first maximum frequency to determine optimized frequencies for cores in the first set of cores; and (c) utilize the second maximum frequency to determine optimized frequencies for cores in the second set of cores.

Example A7 is a processor according to Example A5, wherein the power management control logic is to: (a) assign cores to the first set, based on a first EPP setting for each core in the first set; and (b) assign cores to the second set, based on a second EPP setting that differs from the first EPP setting. Example A7 may also include the features of Example A6.

Example A8 is a processor according to Example A1, further comprising a PMU comprising the power management control logic. Example A8 may also include the features of any one or more of Examples A2-A7.

Example B1 is a data processing system comprising RAM, a processor coupled to the RAM; multiple cores in the processor, and power management control logic in the processor. The power management control logic is to: (a) determine a preliminary frequency for each of the cores; (b) determine a maximum frequency, based on the preliminary frequencies; (c) determine a dynamic tuning frequency, based on the maximum frequency and a reduction factor; (d) in response to the dynamic tuning frequency for a selected core among the cores being greater than the preliminary frequency for the selected core, set the selected core to a frequency that is at least equal to the dynamic tuning frequency; and (e) in response to the preliminary frequency for the selected core being greater than the dynamic tuning frequency for the selected core, set the selected core to a frequency that is at least equal to the preliminary frequency.

Example B2 is a data processing system according to Example B1, wherein the power management control logic is further to: (1) determine a bump frequency for the selected core, based on the maximum frequency; and (2) in response to the bump frequency being (a) greater than the preliminary frequency for the selected core, and (b) greater than the dynamic tuning frequency for the selected core, set the selected core to a frequency that is at least equal to the bump frequency.

Example B3 is a data processing system according to Example B2, wherein the bump frequency for the selected core is also based on a tuned frequency which corresponds to a threshold P-state, in that (a) a relative amount of power savings that would be saved by using a next lower P-state instead of using the threshold P-state is less than (b) a relative amount of performance that would be lost by using the lower P-state instead of using the threshold P-state.

Example B4 is a data processing system according to Example B3, wherein the power management control logic is to set the bump frequency at the lesser of (a) the maximum frequency and (b) the tuned frequency.

Example B5 is a data processing system according to Example B1, wherein (a) the multiple cores comprise a first set of cores and a second set of cores; (b) the operation of determining a preliminary frequency for each of the cores comprises determining the preliminary frequency for each of the cores in the first set of cores and for each of the cores in the second set of cores; and (c) the maximum frequency comprises a first maximum frequency that is based on the preliminary frequencies for the first set of cores. Example B5 may also include the features of any one or more of Examples B2-B4.

Example B6 is a data processing system according to Example B5, wherein the power management control logic is to: (a) determine a second maximum frequency, based on preliminary frequencies for the second set of cores; (b) utilize the first maximum frequency to determine optimized frequencies for cores in the first set of cores; and (c) utilize the second maximum frequency to determine optimized frequencies for cores in the second set of cores.

Example B7 is a data processing system according to Example B5, wherein the power management control logic is to: (a) assign cores to the first set, based on a first EPP setting for each core in the first set; and (b) assign cores to the second set, based on a second EPP setting that differs from the first EPP setting. Example B7 may also include the features of Example B6.

Example B8 is a data processing system according to Example B1, further comprising a PMU in the processor, wherein the PMU comprises the power management control logic. Example B8 may also include the features of any one or more of Examples B2-B7.

Example C1 is a method for managing per-core performance states. The method comprises (a) determining a preliminary frequency for each of multiple cores in a processor; (b) determining a maximum frequency, based on the preliminary frequencies; (c) determining a dynamic tuning frequency, based on the maximum frequency and a reduction factor; (d) in response to the dynamic tuning frequency for a selected core among the cores being greater than the preliminary frequency for the selected core, setting the selected core to a frequency that is at least equal to the dynamic tuning frequency; and (e) in response to the preliminary frequency for the selected core being greater than the dynamic tuning frequency for the selected core, setting the selected core to a frequency that is at least equal to the preliminary frequency.

Example C2 is a method according to Example C1, further comprising (1) determining a bump frequency for the selected core, based on the maximum frequency; and (2) in response to the bump frequency being (a) greater than the preliminary frequency for the selected core, and (b) greater than the dynamic tuning frequency for the selected core, setting the selected core to a frequency that is at least equal to the bump frequency.

Example C3 is a method according to Example C2, wherein the operation of determining a bump frequency for the selected core comprises determining the bump frequency for the selected core, based on (a) the maximum frequency and (b) a tuned frequency which corresponds to a threshold P-state, in that (i) a relative amount of power savings that would be saved by using a next lower P-state instead of using the threshold P-state is less than (ii) a relative amount of performance that would be lost by using the lower P-state instead of using the threshold P-state.

Example C4 is a method according to Example C3, wherein the operation of determining the bump frequency for the selected core comprises setting the bump frequency at the lesser of (a) the maximum frequency and (b) the tuned frequency.

Example C5 is a method according to Example C1, wherein (a) the multiple cores comprise a first set of cores and a second set of cores; (b) the operation of determining a preliminary frequency for each of the cores comprises determining the preliminary frequency for each of the cores in the first set of cores and for each of the cores in the second set of cores; and (c) the maximum frequency comprises a first maximum frequency that is based on the preliminary frequencies for the first set of cores. Also, the method comprises (a) determining a second maximum frequency, based on preliminary frequencies for the second set of cores; (b) utilizing the first maximum frequency to determine optimized frequencies for cores in the first set of cores; and (c) utilizing the second maximum frequency to determine optimized frequencies for cores in the second set of cores. Example C5 may also include the features of any one or more of Examples C2-C4.

Example C6 is a method according to Example C5, further comprising (a) assigning cores to the first set, based on a first EPP setting for each core in the first set; and (b) assigning cores to the second set, based on a second EPP setting that differs from the first EPP setting.

In view of the wide variety of useful permutations that may be readily derived from the example embodiments described herein, this detailed description is intended to be illustrative only, and should not be construed as limiting the scope of coverage.

What is claimed is:

1. A processor comprising:
multiple cores; and
power management control logic to:
determine a preliminary core frequency for each of the cores;
determine a maximum frequency, based on the preliminary core frequencies;
determine a dynamic tuning frequency that is less than the maximum frequency, based on the maximum frequency and a reduction factor;
in response to the dynamic tuning frequency being greater than the preliminary core frequency for a selected core among the cores, set the selected core to a frequency that is at least equal to the dynamic tuning frequency; and
in response to the preliminary core frequency for the selected core being greater than the dynamic tuning frequency, set the selected core to a frequency that is at least equal to the preliminary core frequency for the selected core.

2. A processor according to claim 1, wherein the power management control logic is further to:
determine a bump frequency, based on the maximum frequency; and
in response to the bump frequency being (a) greater than the preliminary core frequency for the selected core, and (b) greater than the dynamic tuning frequency, set the selected core to a frequency that is at least equal to the bump frequency.

3. A processor according to claim 1, wherein:
the multiple cores comprise a first set of cores and a second set of cores;
the operation of determining a preliminary core frequency for each of the cores comprises determining the preliminary core frequency for each of the cores in the first set of cores and for each of the cores in the second set of cores; and
the maximum frequency comprises a first maximum frequency that is based on the preliminary core frequencies for the first set of cores.

4. A processor according to claim 1, further comprising:
a power management unit (PMU) comprising the power management control logic.

5. A processor according to claim 2, wherein the bump frequency is also based on a tuned frequency which corresponds to a threshold performance state (P-state), in that (a) a relative amount of power savings that would be saved by using a next lower P-state instead of using the threshold P-state is less than (b) a relative amount of performance that would be lost by using the lower P-state instead of using the threshold P-state.

6. A processor according to claim 5, wherein the power management control logic is to:
determine a second maximum frequency, based on preliminary core frequencies for the second set of cores;
utilize the first maximum frequency to determine optimized frequencies for cores iii the first set of cores; and
utilize the second maximum frequency to determine optimized frequencies for cores in the second set of cores.

7. A processor according to claim 5, wherein the power management control logic is to:
assign cores to the first set, based on a first efficiency/performance preference (EPP) setting for each core in the first set; and
assign cores to the second set, based on a second EPP setting that differs from the first EPP setting.

8. A processor according to claim 5, wherein the power management control logic is to set the bump frequency at the lesser of (a) the maximum frequency and (b) the tuned frequency.

9. A data processing system comprising:
random access memory (RAM),
a processor coupled to the RAM;
multiple cores in the processor; and
power management control logic in the processor, the power management control logic to:
determine a preliminary core frequency for each of the cores;
determine a maximum frequency, based on the preliminary core frequencies;
determine a dynamic tuning frequency that is less than the maximum frequency, based on the maximum frequency and a reduction factor;
in response to the dynamic tuning frequency being greater than the preliminary core frequency for a selected core among the cores, set the selected core to a frequency that is at least equal to the dynamic tuning frequency; and
in response to the preliminary core frequency for the selected core being greater than the dynamic tuning frequency, set the selected core to a frequency that is at least equal to the preliminary core frequency.

10. A data processing system according to claim 9, wherein the power management control logic is further to:
determine a bump frequency, based on the maximum frequency; and
in response to the bump frequency being (a) greater than the preliminary core frequency for the selected core, and (b) greater than the dynamic tuning frequency, set the selected core to a frequency that is at least equal to the bump frequency.

11. A data processing system according to claim 9, wherein:
the multiple cores comprise a first set of cores and a second set of cores;
the operation of determining a preliminary core frequency for each of the cores comprises determining the preliminary core frequency for each of the cores in the first set of cores and for each of the cores in the second set of cores; and
the maximum frequency comprises a first maximum frequency that is based on the preliminary core frequencies for the first set of cores.

12. A data processing system according to claim 9, further comprising:
a power management unit (PMU) in the processor, wherein the PMU comprises the power management control logic.

13. A data processing system according to claim 10, wherein the bump frequency is also based on a tuned frequency which corresponds to a threshold performance state (P-state), in that (a) a relative amount of power savings that would be saved by using a next lower P-state instead of using the threshold. P-state is less than (b) a relative amount of performance that would be lost by using the lower P-state instead of using the threshold P-state.

14. A data processing system according to claim 11, wherein the power management control logic is to:
- determine a second maximum frequency, based on preliminary core frequencies for the second set of cores;
- utilize the first maximum frequency to determine optimized frequencies for cores in the first set of cores; and
- utilize the second maximum frequency to determine optimized frequencies for cores in the second set of cores.

15. A data processing system according to claim 11, wherein the power management control logic is to:
- assign cores to the first set, based on a first efficiency/performance preference (EPP) setting for each core in the first set; and
- assign cores to the second set, based on a second EPP setting that differs from the first EPP setting.

16. A data processing system according to claim 13, wherein the power management control logic is to set the bump frequency at the lesser of (a) the maximum frequency and (b) the tuned frequency.

17. A method for managing per-core performance states, the method comprising:
- determining a preliminary core frequency for each of multiple cores in a processor;
- determining a maximum frequency, based on the preliminary core frequencies;
- determining a dynamic tuning frequency that is less than the maximum frequency, based on the maximum frequency and a reduction factor;
- in response to the dynamic tuning frequency being greater than the preliminary core frequency for a selected core among the cores, setting the selected core to a frequency that is at least equal to the dynamic tuning frequency; and
- in response to the preliminary core frequency for the selected core being greater than the dynamic tuning frequency, setting the selected core to a frequency that is at least equal to the preliminary core frequency.

18. A method according to claim 17, further comprising:
- determining a bump frequency, based on the maximum frequency; and
- in response to the bump frequency being (a) greater than the preliminary core frequency for the selected core, and (b) greater than the dynamic tuning frequency fur the selected core, setting the selected core to a frequency that is at least equal to the bump frequency.

19. A method according to claim 17, wherein:
- the multiple cores comprise a first set of cores and a second set of cores;
- the operation of determining a preliminary core frequency for each of the cores comprises determining the preliminary core frequency for each of the cores in the first set of cores and for each of the cores in the second set of cores;
- the maximum frequency comprises a first maximum frequency that is based on the preliminary core frequencies for the first set of cores; and
- the method comprises:
  - determining a second maximum frequency, based on preliminary core frequencies for the second set of cores;
  - utilizing the first maximum frequency to determine optimized frequencies for cores in the first set of cores; and
  - utilizing the second maximum frequency to determine optimized frequencies for cores in the second set of cores.

20. A method according to claim 18, wherein the operation of determining a bump frequency comprises:
- determining the bump frequency, based on (a) the maximum frequency and (b) a tuned frequency which corresponds to a threshold performance state (P-state), in that (i) a relative amount of power savings that would be saved by using a next lower P-state instead of using the threshold P-state is less than (ii) a relative amount of performance that would be lost by using the lower P-state instead of using the threshold P-state.

21. A method according to claim 19, further comprising:
- assigning cores to the first set, based on a first efficiency/performance preference (EPP) setting for each core in the first set; and
- assigning cores to the second set, based on a second EPP setting that differs from the first EPP setting.

22. A method according to claim 20, wherein the operation of determining the bump frequency comprises:
- setting the bump frequency at the lesser of (a) the maximum frequency and (b) the tuned frequency.

* * * * *

UNITED STATES PATENT AND TRADEMARK OFFICE
CERTIFICATE OF CORRECTION

PATENT NO. : 11,157,329 B2  
APPLICATION NO. : 16/523009  
DATED : October 26, 2021  
INVENTOR(S) : Weissmann et al.

Page 1 of 1

It is certified that error appears in the above-identified patent and that said Letters Patent is hereby corrected as shown below:

In the Claims

Column 23:
Line 65, "iii" should be --in--;

Column 24:
Line 13, "(RAM)," should be --(RAM);--;

Column 24:
Line 65, "threshold. P-state" should be --threshold P-state--;

Column 25:
Line 44, delete "fur";

Column 26:
Line 1, "the selected core, setting the selected core" should be --setting the selected core--.

Signed and Sealed this  
Fourteenth Day of December, 2021

Drew Hirshfeld  
*Performing the Functions and Duties of the*  
*Under Secretary of Commerce for Intellectual Property and*  
*Director of the United States Patent and Trademark Office*